United States Patent
Yi et al.

(10) Patent No.: US 10,352,215 B2
(45) Date of Patent: Jul. 16, 2019

(54) METHOD AND SYSTEM FOR MODELING REDUCTANT DEPOSIT GROWTH

(71) Applicant: Caterpillar Inc., Peoria, IL (US)

(72) Inventors: Yong Yi, Dunlap, IL (US); Shuhai Hou, Peoria, IL (US); Hongsheng Sun, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 55 days.

(21) Appl. No.: 15/688,964

(22) Filed: Aug. 29, 2017

(65) Prior Publication Data

US 2019/0063289 A1 Feb. 28, 2019

(51) Int. Cl.
*F01N 3/20* (2006.01)
*B01D 53/94* (2006.01)
*G01B 11/06* (2006.01)

(52) U.S. Cl.
CPC ....... *F01N 3/2026* (2013.01); *B01D 53/9431* (2013.01); *B01D 53/9495* (2013.01); *F01N 3/208* (2013.01); *G01B 11/0625* (2013.01); *B01D 2258/012* (2013.01)

(58) Field of Classification Search
CPC ... F01N 3/2026; F01N 3/208; B01D 53/9495; B01D 53/9431; B01D 2258/012; G01B 11/0625
See application file for complete search history.

(56) References Cited

U.S. PATENT DOCUMENTS

| 8,004,695 | B1 | 8/2011 | Kaemingk et al. |
| 8,739,517 | B2 | 6/2014 | Xu et al. |
| 9,097,159 | B2 | 8/2015 | Keghelian et al. |
| 9,217,350 | B2 | 12/2015 | Upadhyay et al. |
| 2011/0030343 | A1* | 2/2011 | Kiser ............... F01N 3/208 60/274 |
| 2014/0017794 | A1* | 1/2014 | Zeng ............... B01D 53/9495 436/55 |
| 2016/0281574 | A1 | 9/2016 | Abel et al. |

FOREIGN PATENT DOCUMENTS

| EP | 2927443 | 10/2015 |
| JP | 592884 | 6/2016 |

* cited by examiner

*Primary Examiner* — Brandon D Lee
(74) *Attorney, Agent, or Firm* — Harrity & Harrity LLP

(57) ABSTRACT

A method and system for modeling growth of reductant deposits for an aftertreatment system on a real time basis using input including exhaust gas temperature, exhaust gas flow rate, and reductant dosing rate. The growth of the reductant deposits are affected by a rate at which reductant accumulates and decomposes from a surface of the aftertreatment system. Thus, the method and system disclosed determines a net reductant deposit growth rate value based on a reductant deposit accumulation rate value and a reductant deposit decomposition rate value. Further, the method and system disclosed determines a reductant mass deposit value based on the net reductant deposit growth rate value. The reductant mass deposit value determined by the method and system may then be used to control a regeneration strategy of the aftertreatment system to eliminate the reductant deposits from the aftertreatment system.

20 Claims, 6 Drawing Sheets

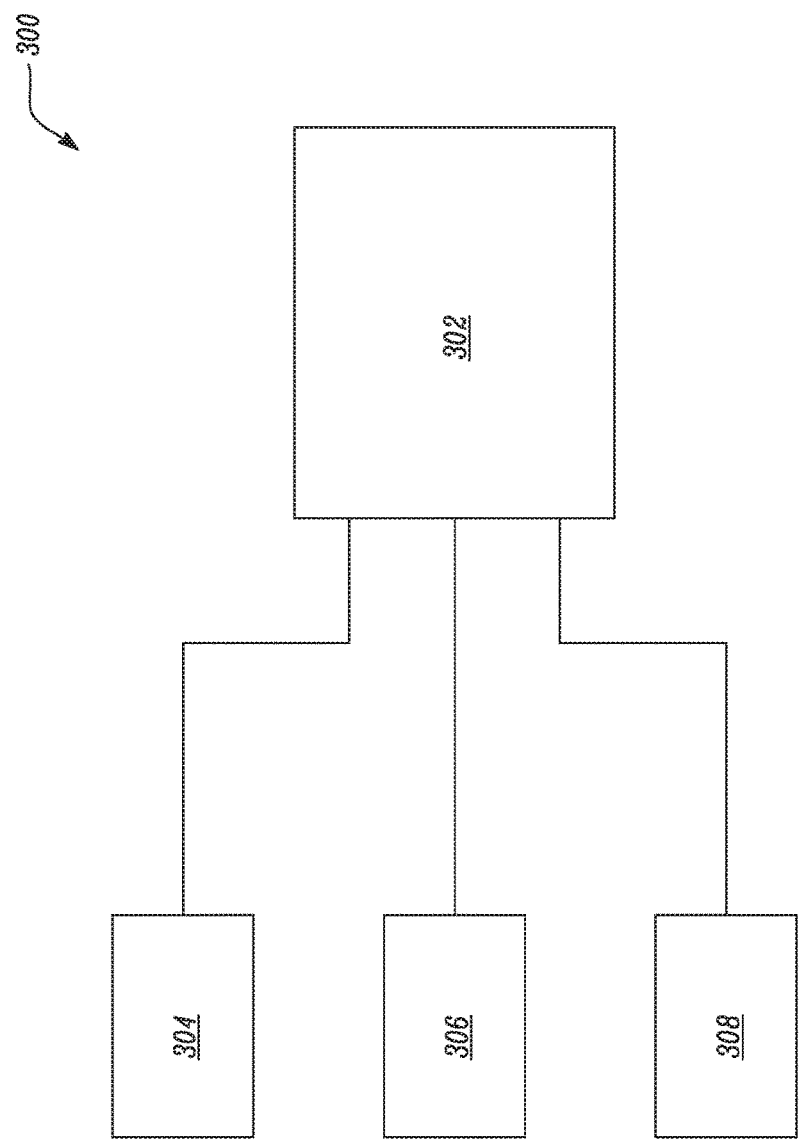

METHOD AND SYSTEM FOR MODELING REDUCTANT DEPOSIT GROWTH

TECHNICAL FIELD

The present disclosure relates to a method and a system for modeling growth of reductant deposits in an aftertreatment system.

BACKGROUND

Engines, such as internal combustion engines, often include an aftertreatment system for reducing and converting particulate matter or nitrogen oxides (NOx) that may be present in an exhaust gas flow, to comply with emission regulation standards. The aftertreatment system may include a selective catalytic reduction (SCR) module that reduces a concentration of NOx in the exhaust gas flow. Before the exhaust gas flow enters an SCR module, a reductant is typically dosed into the exhaust gas flow passing through the aftertreatment system.

Performance of such an SCR module is affected by adequate conversion of the reductant into reducing agents. Under certain operating conditions, such as high dosing rate of the reductant, low exhaust gas temperature, and flow rate of the exhaust gas flow, reductant mass deposits can form on surfaces of the aftertreatment system and/or the SCR module, which in turn results in poor NOx conversion, suboptimal performance of the SCR module, and sometimes even failure of the engine system. To reduce such deposits formed in the SCR module, periodic regeneration of the SCR catalyst may be necessary.

U.S. Pat. No. 8,739,517 describes a method for controlling regeneration of an SCR catalyst. The method includes coordinating the regeneration duration and temperature (e.g., longer/shorter regenerations and/or lower/higher temperatures) to the urea deposit loading. In this way, improved regeneration may be achieved due to the particular nature of urea deposits on SCR catalysts.

SUMMARY OF THE DISCLOSURE

In one aspect of the present disclosure, a method for calculating reductant mass deposits for an aftertreatment system is provided. The reductant mass deposits are calculated on a real time basis. The method includes receiving a set of values by a control module. The set of values include a temperature value of an exhaust gas flow, a flow rate value of the exhaust gas flow, and a dosage rate value of reductant dosed into the exhaust gas flow. The method also includes estimating, by the control module, a reductant deposit accumulation rate value based on the set of values received by the control module. The method further includes estimating, by the control module, a reductant deposit decomposition rate value based on the set of values received by the control module. The method includes calculating, by the control module, a net reductant deposit growth rate value based on the reductant deposit accumulation rate value and the reductant deposit decomposition rate value. The method also includes calculating, by the control module, a reductant mass deposit value based on the net reductant deposit growth rate value.

In another aspect of the present disclosure, a method for controlling reductant mass deposits for an aftertreatment system on a real time basis is provided. The method includes receiving a set of values by a control module. The set of values include a temperature value of an exhaust gas flow, a flow rate value of the exhaust gas flow, and a dosage rate value of reductant dosed into the exhaust gas flow. The method also includes estimating, by the control module, a reductant deposit accumulation rate value based on the set of values received by the control module. The method further includes estimating, by the control module, a reductant deposit decomposition rate value based on the set of values received by the control module. The method includes calculating, by the control module, a net reductant deposit growth rate value based on the reductant deposit accumulation rate value and the reductant deposit decomposition rate value. The method also includes calculating, by the control module, a reductant mass deposit value based on the net reductant deposit growth rate value. The method further includes performing a two-tier regeneration of the aftertreatment system based on the reductant mass deposit value.

In yet another aspect of the present disclosure, an aftertreatment system is provided. The aftertreatment system includes a mixing tube adapted to receive an exhaust gas flow. The aftertreatment system also includes a reductant dosing module adapted to dose reductant in the exhaust gas flow entering the mixing tube. The aftertreatment system further includes a selective catalytic reduction module positioned downstream of the mixing tube with respect to a flow direction of the exhaust gas flow. The aftertreatment system includes a control module for calculating reductant mass deposits for the aftertreatment system. The reductant mass deposits are calculated on a real time basis. The control module is configured to receive a set of values. The set of values include a temperature value of the exhaust gas flow received from a temperature sensor, a flow rate value of the exhaust gas flow received from a flow rate sensor, and a dosage rate value of reductant dosed into the exhaust gas flow received from the reductant dosing module. The control module is also configured to estimate a reductant deposit accumulation rate value based on the set of values. The control module is further configured to estimate a reductant deposit decomposition rate value based on the set of values. The control module is configured to calculate a net reductant deposit growth rate value based on the reductant deposit accumulation rate value and the reductant deposit decomposition rate value. The control module is also configured to calculate a reductant mass deposit value based on the net reductant deposit growth rate value.

Other features and aspects of this disclosure will be apparent from the following description and the accompanying drawings.

BRIEF DESCRIPTION OF THE DRAWINGS

FIG. 3 is a block diagram of a system for controlling the reductant mass deposits;

DETAILED DESCRIPTION

Wherever possible, the same reference numbers will be used throughout the drawings to refer to the same or like parts. Also, corresponding or similar reference numbers will be used throughout the drawings to refer to the same or corresponding parts.

Figure 1:
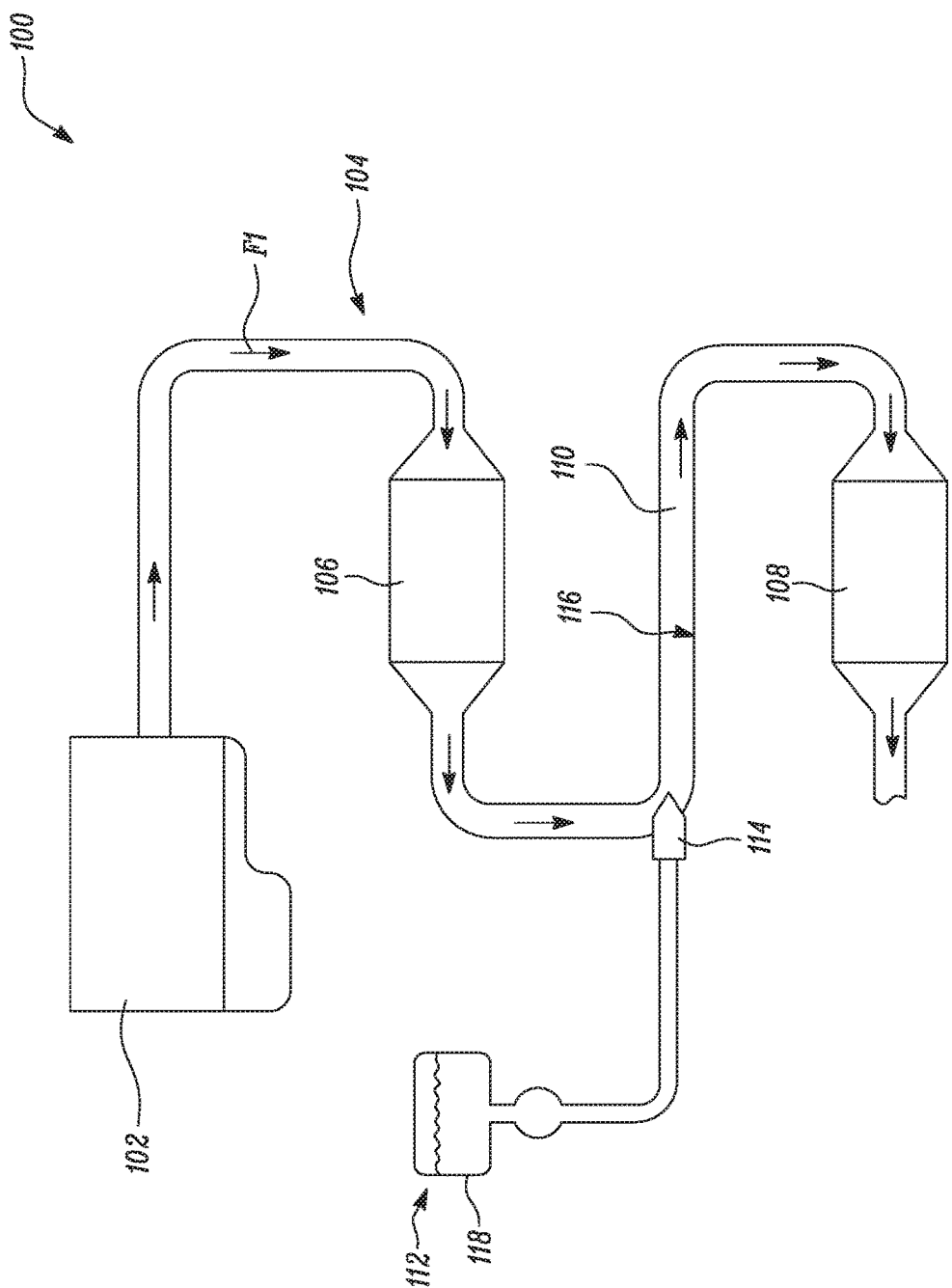
FIG. 1 is a schematic view of an exemplary engine system.

FIG. 1 is a schematic view of an engine system 100. The engine system 100 includes an engine 102. The engine 102 may be an internal combustion engine, such as a reciprocating piston engine. Further, the engine 102 may be a spark ignition engine or a compression ignition engine, such as a diesel engine, a homogeneous charge compression ignition engine, a reactivity controlled compression ignition engine, or any other compression ignition engine known in the art. The engine 102 may be fueled by one or a combination of gasoline, diesel fuel, biodiesel, dimethyl ether, alcohol, natural gas, propane, or any other combustion fuel known in the art.

The engine 102 may be used to power a machine (not shown) including, but not limited to, an on-highway truck, an off-highway truck, a loader, an electric generator, and the like. Further, the engine system 100 may be associated with an industry including, but not limited to, transportation, mining, construction, agriculture, forestry, power generation, and material handling.

The engine system 100 includes an aftertreatment system 104. The aftertreatment system 104 is in fluid communication with an exhaust manifold (not shown) of the engine 102. The aftertreatment system 104 treats an exhaust gas flow exiting the exhaust manifold of the engine 102. The exhaust gas flow contains emission compounds that may include nitrogen oxides (NOx), unburned hydrocarbons, particulate matter, and other such combustion products. The aftertreatment system 104 may trap or convert NOx, unburned hydrocarbons, particulate matter, its combinations, or other combustion products in the exhaust gas flow before exiting the engine system 100.

The aftertreatment system 104 includes a filter 106. The filter 106 could be any filter known in the art that is appropriate to reduce particulate matter in the exhaust gas flow in the subject application, such as a wall flow filter, a partial flow filter, or a flow through filter. In one example, the filter 106 may be a Diesel Particulate Filter (DPF). The filter 106 may be coated with a suitable catalyst to promote oxidation of any particulate matter that is present in the exhaust gas flow. Additionally, in another aspect, the aftertreatment system 104 may also include a diesel oxidation catalyst (not shown). In such an aspect, the diesel oxidation catalyst may be positioned downstream of the filter 106, with respect to an exhaust gas flow direction 'F1'.

The aftertreatment system 104 also includes a selective catalytic reduction (SCR) module 108. The SCR module 108 is positioned downstream of the filter 106, with respect to the exhaust gas flow direction 'F1'. The SCR module 108 includes a bank of catalysts for facilitating reaction, reduction, or removal of NOx from the exhaust gas flow passing through the SCR module 108.

A mixing tube 110 fluidly couples the filter 106 with the SCR module 108. A configuration of the mixing tube 110 shown in the accompanying figures is exemplary in nature, and the configuration of the mixing tube 110 may vary, based on application requirements. For example, the mixing tube 110 may include a straight tube with no bends that couples the filter 106 with the SCR module 108. Alternatively, the mixing tube 110 may include a U-shaped tube, without any limitations. Further, the aftertreatment system 104 includes a reductant dosing module 112. The reductant dosing module 112 dispenses a reductant in the exhaust gas flow passing through the mixing tube 110, before the exhaust gas flow enters the SCR module 108. As shown in FIG. 1, the reductant dosing module 112 includes a tank 118 to store the reductant. The reductant may be a fluid, such as, Diesel Exhaust Fluid (DEF). The reductant may include urea, ammonia, or other reducing agent known in the art.

Further, the reductant dosing module 112 includes an injector 114 for dosing the reductant in the mixing tube 110. Alternatively, the reductant dosing module 112 may include more than one injector and a number of the injectors may vary based on the parameters of the application. Further, the mixing tube 110 may include a number of mixing elements (not shown) positioned within the mixing tube 110 to uniformly mix the reductant with the exhaust gas flow. The aftertreatment system 104 disclosed herein is provided as a non-limiting example. These and other variations in aftertreatment system design are possible without deviating from the scope of the disclosure.

The reductant dosed in the exhaust gas flow has a tendency to deposit on a surface of the aftertreatment system 104. More particularly, the reductant gets deposited on an inner surface 116 of the mixing tube 110. When the reductant is dosed in the mixing tube 110, some of the reductant accumulates on the inner surface 116 of the mixing tube 110 whereas some of the reductant decomposes. Over a period of time, it is observed that a reductant deposit decomposition rate value is lesser than a reductant deposit accumulation rate value, causing reductant mass deposits to grow on the inner surface 116. The term "reductant deposit accumulation rate value" mentioned herein is defined as a rate at which the reductant that is dosed in the mixing tube 110 accumulates on the inner surface 116. Further, the term "reductant deposit decomposition rate value" mentioned herein is defined as a rate at which the reductant accumulated on the inner surface 116 decomposes.

Figure 2A:
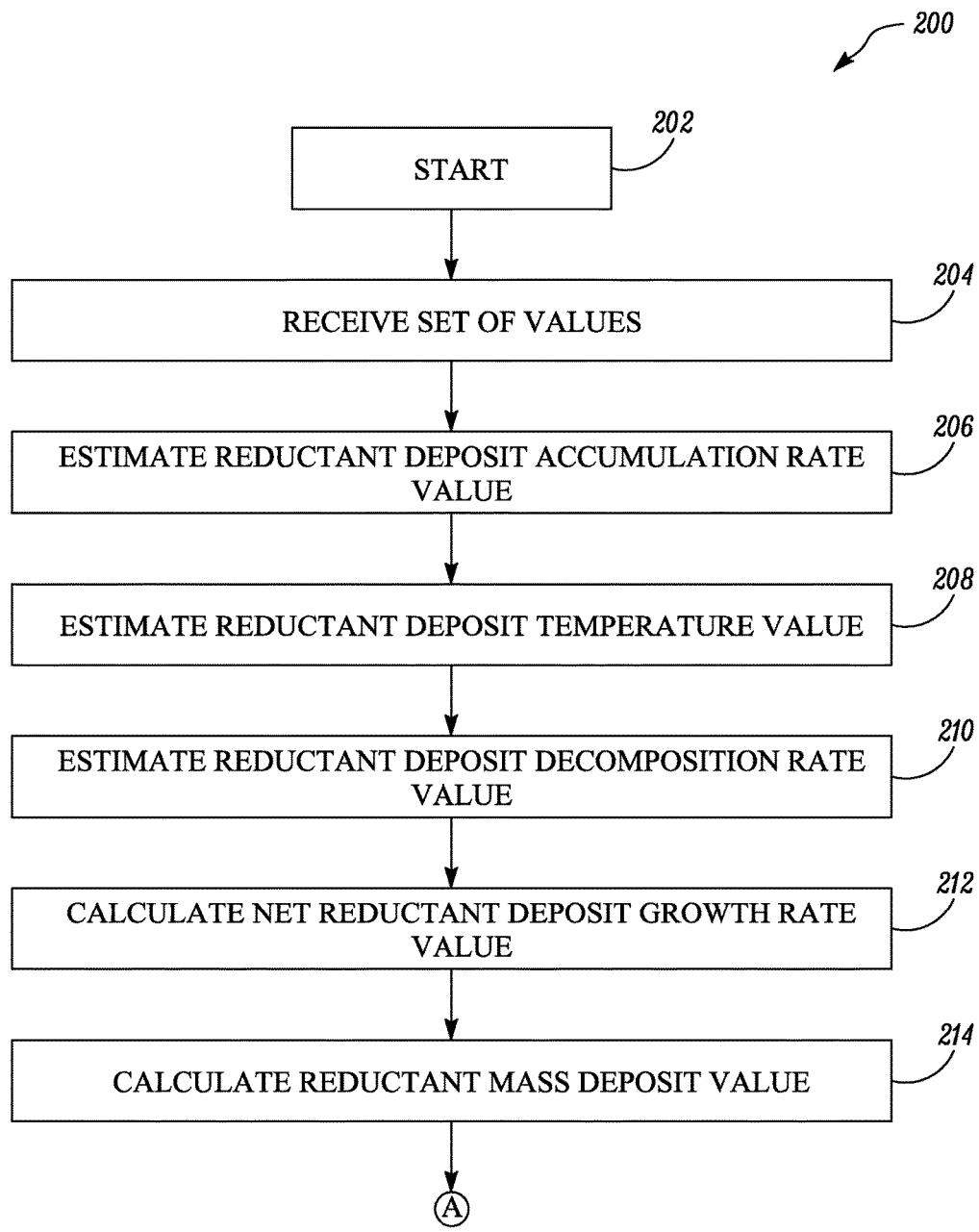
FIG. 2A and FID. 2B are flowcharts for a process of controlling reductant mass deposits for an aftertreatment system of the engine system, according to one embodiment of the present disclosure.
Figure 2B:
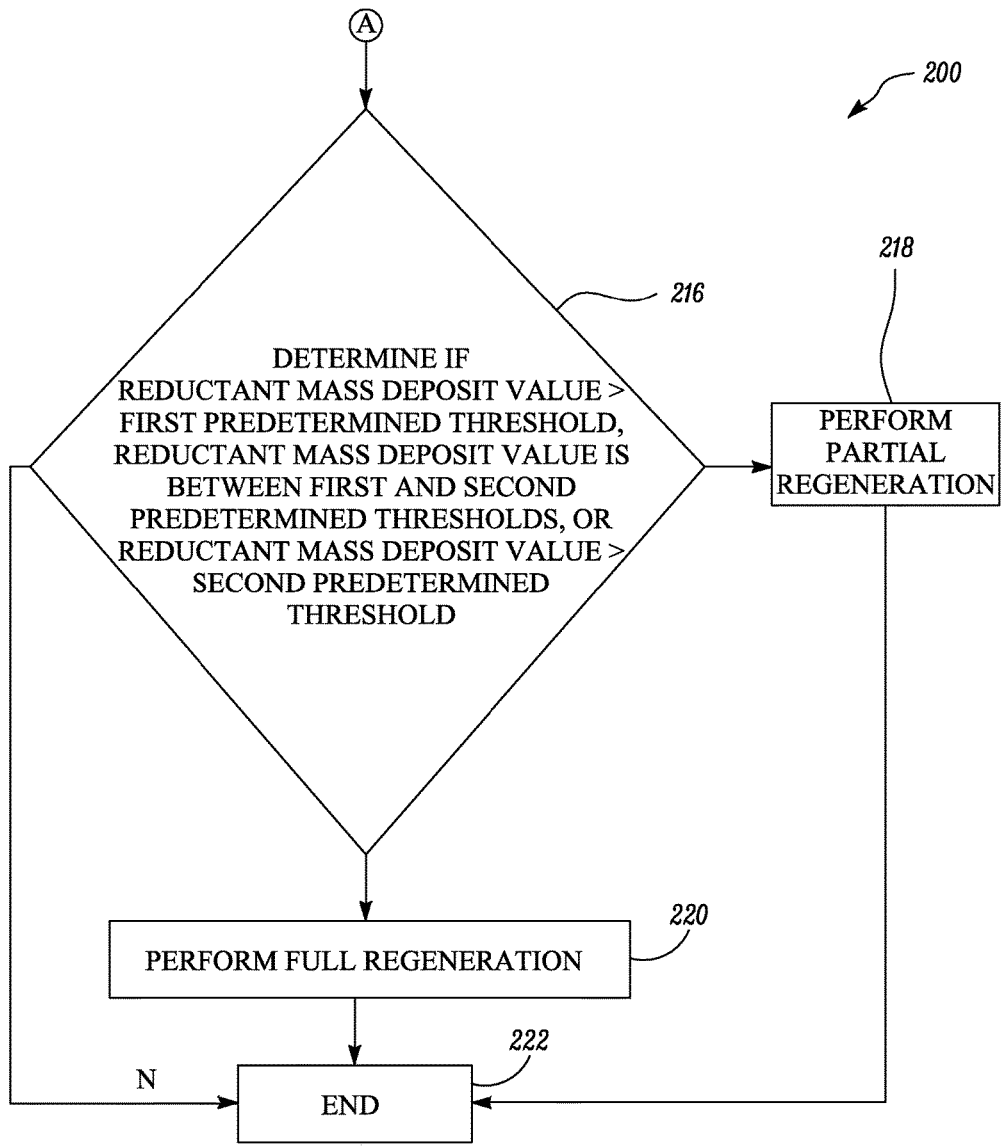

Referring to FIG. 2A and FIG. 2B, flowcharts for a process 200 of controlling the reductant mass deposits in the mixing tube 110 are illustrated. The process 200 operates on a real time basis. The process 200 is implemented by a control module 302, and may be stored in a memory of the control module 302. Alternatively, the process 200 may be stored and implemented by an electronic control unit (ECU) of the engine system 100 or an electronic control module (ECM) present on-board the machine on which the engine system 100 is mounted. It should be noted that the control module 302 is a part of a system 300 (shown in FIG. 3) for controlling the reductant mass deposits.

The process 200 (or algorithm) begins at block 202 in which the method implemented by the control module 302 starts or begins operation. At block 204, the control module 302 receives a set of values. The set of values are received on a real time basis. The set of values include a temperature value of the exhaust gas flow entering the mixing tube 110, a flow rate value of the exhaust gas flow entering the mixing tube 110, and a dosage rate value of the reductant dosed into the exhaust gas flow passing through the mixing tube 110.

The control module 302 receives the temperature value of the exhaust gas flow from a temperature sensor 304 (shown in FIG. 3) that is communicably coupled to the control module 302. The temperature sensor 304 may be mounted within the mixing tube 110 or upstream of the mixing tube 110 with respect to the exhaust gas flow direction "F1". The temperature sensor 304 may embody any known in the art temperature measuring device, such as a thermocouple, without any limitations.

Also, the control module 302 receives the flow rate value of the exhaust gas flow from a flow rate sensor 306 (shown in FIG. 3). The flow rate sensor 306 is communicably coupled to the control module 302 and may be mounted within the mixing tube 110 or upstream of the mixing tube 110 with respect to the exhaust gas flow direction "F1". Further, the control module 302 is also in communication with the reductant dosing module 112. More particularly, the control module 302 is in communication with a flow rate sensor 308 (shown in FIG. 3) associated with the reductant dosing module 112. The flow rate sensor 308 measures the dosage rate value of the reductant dosed by the injector 114 into the exhaust gas flow passing through the mixing tube 110. The flow rate sensors 306, 308 associated with the mixing tube 110 and the reductant dosing module 112, respectively, may embody any known in the art flow measurement device, such as a flow meter, without any limitations.

At block 206, the control module 302 estimates the reductant deposit accumulation rate value. The reductant deposit accumulation rate value is estimated based on the set of values that are received by the control module 302 at the block 204. In one example, the reductant deposit accumulation rate value is proportional to a surface area of the reductant mass deposits and the reductant deposit accumulation rate value accelerates as the reductant mass deposits on the inner surface 116 increases.

At block 208, the control module 302 estimates the reductant deposit temperature value. The reductant deposit temperature value is estimated based on the set of values received by the control module 302 at the block 204. In one example, the reductant deposit temperature value is used as a parameter to estimate the reductant deposit decomposition rate value. At block 210, the control module 302 estimates the reductant deposit decomposition rate value. The reductant deposit decomposition rate value is estimated based on the set of values that are received by the control module 302 at the block 204. In one example, the reductant deposit decomposition rate value is estimated based on the reductant deposit accumulation rate value and the reductant deposit temperature value estimated at the blocks 306 and 308, respectively. In one example, the reductant deposit decomposition rate value is proportional to the surface area of the reductant mass deposits on the inner surface 116.

At block 212, the control module 302 calculates a net reductant deposit growth rate value. The term "net reductant deposit growth rate value" mentioned herein can be defined as a rate at which the reductant mass deposits grow on the inner surface 116 of the mixing tube 110. The net reductant deposit growth rate value is calculated based on the reductant deposit accumulation rate value and the reductant deposit decomposition rate value calculated at the blocks 206 and 210, respectively. More particularly, the net reductant deposit growth rate value is a difference between the reductant deposit accumulation rate value and the reductant deposit decomposition rate value and is calculated using the following equation:

$$\frac{dm}{dt} = \dot{m}_{accumulate} - \dot{m}_{decompose} \quad \text{Equation (i)}$$

Where, $$\frac{dm}{dt}$$

is the net reductant deposit growth rate value, $\dot{m}_{accumulate}$ is the reductant deposit accumulation rate value, and $\dot{m}_{decompose}$ is the reductant deposit decomposition rate value.

At block 214, the control module 302 calculates a reductant mass deposit value. The reductant mass deposit value is calculated based on the net reductant deposit growth rate value calculated at the block 212. It should be noted that in some conditions, the reductant deposit decomposition rate value is slower than the reductant deposit accumulation rate value. Thus, the reductant mass deposit value increases as time progresses.

Further, a two-tier regeneration of the aftertreatment system 104 is performed based on the reductant mass deposit value. More particularly, the control module 302 compares the reductant mass deposit value with a first predetermined threshold of the reductant mass deposit value and a second predetermined threshold of the reductant mass deposit value. The second predetermined threshold is greater than the first predetermined threshold. In one example, the first and second predetermined thresholds may be defined based on allowable reductant mass deposit values that do not interfere with an operation of the aftertreatment system 104. The first and second predetermined thresholds may be saved in the memory of the control module 302 or in a database, and can be retrieved by the control module 302 therefrom as and when required.

Further, at block 216, the control module 302 determines if the reductant mass deposit value exceeds the first predetermined threshold, if the reductant mass deposit value lies between the first and second predetermined thresholds, of if the reductant mass deposit value exceeds the second predetermined threshold. If the reductant mass deposit value exceeds the first predetermined threshold but lies between the first and second predetermined thresholds, the process 200 moves to block 218. At block 218, the control module 302 generates a control signal for performing a partial regeneration of the aftertreatment system 104.

It should be noted that the partial regeneration is a low temperature regeneration strategy, and in this example, the partial regeneration is dependent on the reductant mass deposit value and is independent of any predetermined regeneration interval for the aftertreatment system 104 or a regeneration of the filter 106. In one example, the partial regeneration of the aftertreatment system 104 may include regeneration of each of the filter 106, the mixing tube 110, and the SCR module 108. Further, after the partial regeneration is performed, the process 200 moves to block 222 and ends operation. However, if the control module 302 determines that the reductant mass deposit value is less than the first predetermined threshold, the process 200 directly moves from the block 216 to the block 222 and ends operation.

Further, if the control module 302 determines that the reductant mass deposit value has exceeded the second predetermined threshold, the process 200 moves to block 220. At block 220, the control module 302 generates a control signal for performing a full regeneration of the aftertreatment system 104.

It should be noted that the full regeneration is a high temperature regeneration strategy, and in this example, the full regeneration is dependent on the reductant mass deposit value and a predetermined time threshold from the previous full regeneration that was performed on the aftertreatment system 104. The predetermined time threshold may vary based on system requirements. In one example, the full regeneration of the aftertreatment system 104 may include regeneration of each of the filter 106, the mixing tube 110, and the SCR module 108. However, the full regeneration of the aftertreatment system 104 need not be delayed to synchronize with the regeneration of the filter 106. In one example, after the full regeneration of the aftertreatment system 104 is performed, the reductant mass deposit value on the inner surface 116 is zero. Further, after the full regeneration is performed, the process 200 moves to the block 222 and ends operation.

It should be noted that the control module 302 may be configured to perform the partial or full regeneration of the aftertreatment system 104 by itself. In another example, the control module 302 may generate and transmit the control signal to the ECU or to a regeneration module associated with the aftertreatment system 104 for performing the partial or full regeneration, without any limitations. Further, in one exemplary embodiment, the control module 302 may transmit control signals to the reductant dosing module 112 to adjust the dosage rate value of the reductant dosed into the exhaust gas flow, based on the reductant mass deposit value, without any limitations.

The control module 302 may embody a single microprocessor or multiple microprocessors for receiving signals from components of the engine system 100. Numerous commercially available microprocessors may be configured to perform the functions of the control module 302. It should be appreciated that the control module 302 may embody a machine microprocessor capable of controlling numerous machine functions. A person of ordinary skill in the art will appreciate that the control module 302 may additionally include other components and may also perform other functions not described herein.

INDUSTRIAL APPLICABILITY

The present disclosure relates to methods 400, 500 and the system 300 for modeling growth of reductant deposits in the aftertreatment system 104. More particularly, the method 400 allows real time calculation of the reductant mass deposit values on the inner surface 116 of the mixing tube 110. Further, the method 500 ensures automatic removal of the reductant mass deposits from the inner surface 116 before they can have a detrimental effect on the performance of the aftertreatment system 104. The methods 400, 500 disclosed herein ensure a flexible solution for reductant mass deposit protection for aftertreatment systems that covers a wide range of machine and industrial applications at minimal additional cost. Further, the methods 400, 500 allow dynamic tracking and cleaning of the reductant mass deposits on the mixing tube 110 under transient engine cycles, thereby improving NOx conversion efficiency and deposit robustness.

Further, the calculations of the reductant mass deposit value can be used in dosing control strategy development. More particularly, the reductant mass deposit value calculated by the control module 302 can be used to control the rate at which the reductant is dosed in the exhaust gas flow. Thus, the method 400 disclosed herein may be used on any machine in use so as to provide real time adjustment of the reductant dosing in order to eliminate reductant mass deposit buildup during regular machine operation.

Figure 4:
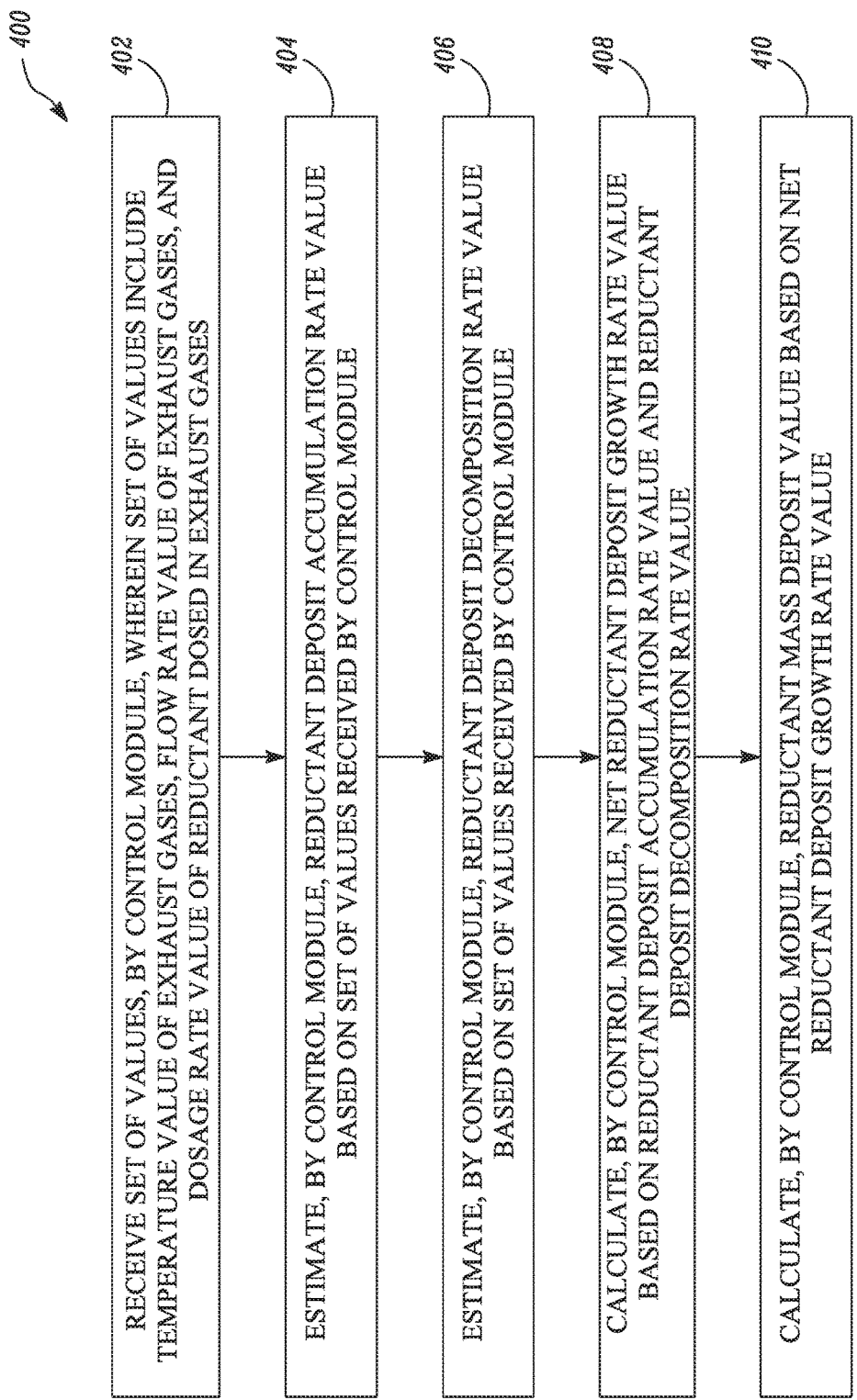
FIG. 4 is a flowchart for a method of calculating reductant mass deposits for the aftertreatment system.

FIG. 4 is a flowchart for the method 400 of calculating the reductant mass deposits for the aftertreatment system 104. The reductant mass deposits are calculated on a real time basis. At step 402, the control module 302 receives the set of values. The set of values include the temperature value of the exhaust gas flow, the flow rate value of the exhaust gas flow, and the dosage rate value of the reductant dosed into the exhaust gas flow.

At step 404, the control module 302 estimates the reductant deposit accumulation rate value based on the set of values received by the control module 302 at the step 402. At step 406, the control module 302 estimates the reductant deposit decomposition rate value based on the set of values received by the control module 302 at the step 402. Further, the control module 302 also estimates the reductant deposit temperature value based on the set of values received by the control module 302 at the step 402.

At step 408, the control module 302 calculates the net reductant deposit growth rate value based on the reductant deposit accumulation rate value and the reductant deposit decomposition rate value calculated by the control module 302 at the steps 404 and 406, respectively. At step 410, the control module 302 calculates the reductant mass deposit value based on the net reductant deposit growth rate value that is calculated by the control module 302 at the step 408. More particularly, the reductant mass deposit values are calculated for the inner surface 116 of the mixing tube 110. Further, the calculation of the reductant mass deposit value can be used to control the dosage rate value of the reductant dosed into the exhaust gas flow.

Also, based on the reductant mass deposit value, the two-tier regeneration of the aftertreatment system 104 may be performed. More particularly, if the reductant mass deposit value exceeds the first predetermined threshold, the partial regeneration of the aftertreatment system 104 is performed. If the reductant mass deposit value exceeds the second predetermined threshold, the full regeneration of the aftertreatment system 104 is performed. Further, the full regeneration can also be performed when the time since the previous full regeneration of the aftertreatment system 104 exceeds the predetermined time threshold. The second predetermined threshold is greater than the first predetermined threshold.

Figure 5:
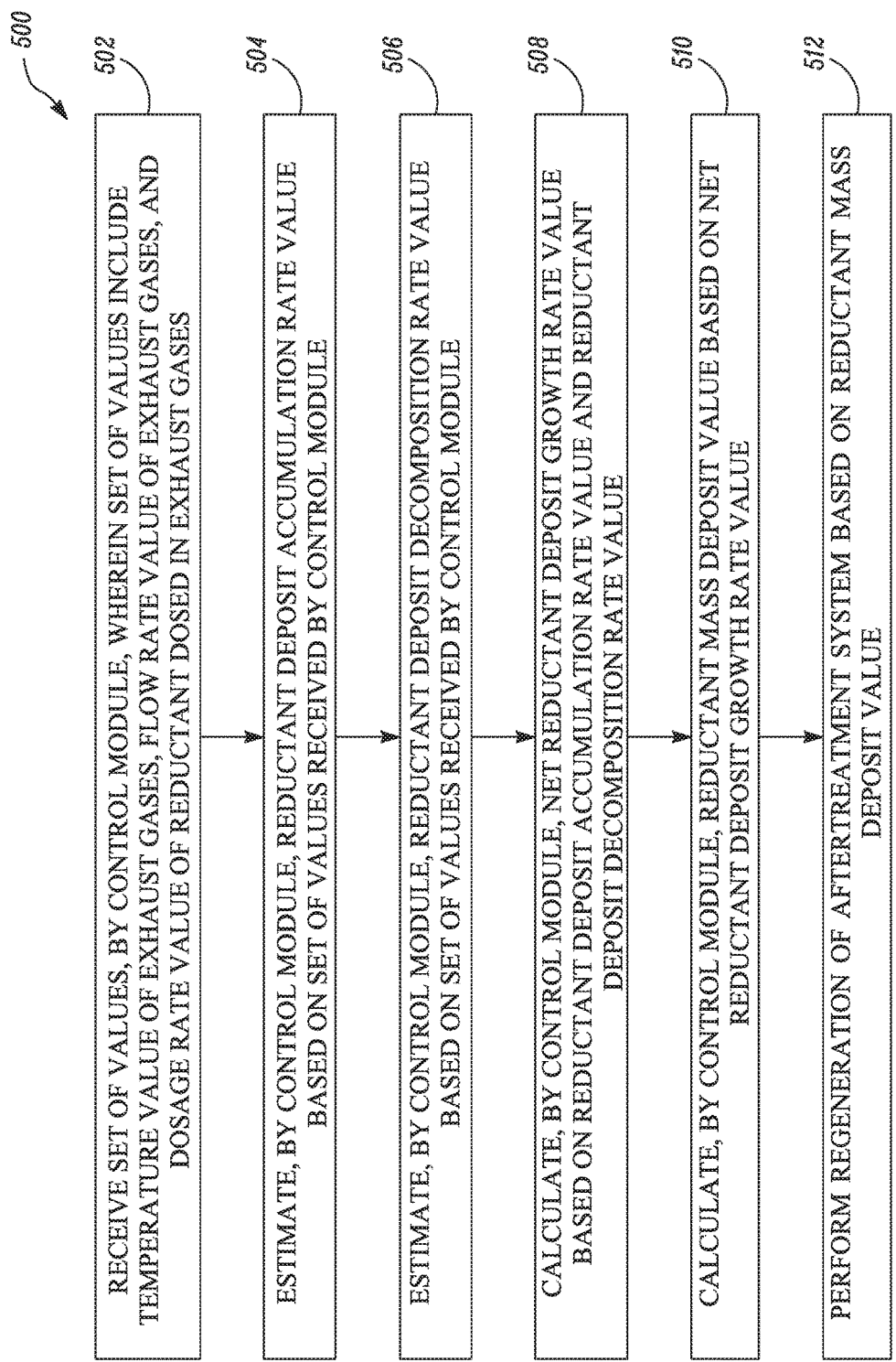
FIG. 5 is a flowchart for a method of controlling the reductant mass deposits for the aftertreatment system.

FIG. 5 is a flowchart for the method 500 of controlling the reductant mass deposits for the aftertreatment system 104 on a real time basis. At step 502, the control module 302 receives the set of values. The set of values include the temperature value of the exhaust gas flow, the flow rate value of the exhaust gas flow, and the dosage rate value of the reductant dosed into the exhaust gas flow.

At step 504, the control module 302 estimates the reductant deposit accumulation rate value based on the set of values received by the control module 302 at the step 502. At step 506, the control module 302 estimates the reductant deposit decomposition rate value based on the set of values received by the control module 302 at the step 502. Further, the control module 302 also estimates the reductant deposit temperature value based on the set of values received by the control module 302 at the step 502.

At step 508, the control module 302 calculates the net reductant deposit growth rate value based on the reductant deposit accumulation rate value and the reductant deposit decomposition rate value calculated by the control module 302 at the steps 504 and 506, respectively. At step 510, the control module 302 calculates the reductant mass deposit value based on the net reductant deposit growth rate value calculated by the control module 302 at the step 508. More particularly, the reductant mass deposit value is calculated for the inner surface 116 of the mixing tube 110. Further, the calculation of the reductant mass deposit value can be used to control the dosage rate value of the reductant dosed into the exhaust gas flow.

At step 512, the two-tier regeneration of the aftertreatment system 104 is performed based on the reductant mass deposit value calculated by the control module 302 at the step 510. More particularly, if the reductant mass deposit value exceeds the first predetermined threshold, the partial regeneration of the aftertreatment system 104 is performed. Further, if the reductant mass deposit value exceeds the second predetermined threshold, the full regeneration of the aftertreatment system 104 is performed. The full regeneration can also be performed when the time since the previous full regeneration of the aftertreatment system 104 exceeds the predetermined time threshold. The second predetermined threshold is greater than the first predetermined threshold.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A method comprising:
receiving, by one or more processors, information identifying a set of values,
   wherein the set of values include a temperature value of an exhaust gas flow, a flow rate value of the exhaust gas flow, and a dosage rate value of reductant dosed into the exhaust gas flow;
estimating, by the one or more processors, a reductant deposit accumulation rate value based on the set of values;
estimating, by the one or more processors, a reductant deposit decomposition rate value based on the set of values;
calculating, by the one or more processors, a net reductant deposit growth rate value based on the reductant deposit accumulation rate value and the reductant deposit decomposition rate value;
calculating, by the one or more processors, a reductant mass deposit value based on the net reductant deposit growth rate value;
performing a partial regeneration of an aftertreatment system when the reductant mass deposit value satisfies a first threshold; and
performing a full regeneration of the aftertreatment system when at least the reductant mass deposit value satisfies a second threshold or a period of time satisfies a time threshold.

2. The method of claim 1, wherein the reductant mass deposit value is calculated for an inner surface of a mixing tube of the aftertreatment system.

3. The method of claim 1, where performing the partial regeneration of the aftertreatment system comprises:
performing the partial regeneration of the aftertreatment system when the reductant mass deposit value exceeds the first threshold.

4. The method of claim 1, wherein the second threshold is greater than the first threshold.

5. The method of claim 1, further including:
controlling the dosage rate value of the reductant dosed into the exhaust gas flow based on the reductant mass deposit value.

6. The method of claim 1, further including:
estimating a reductant deposit temperature value based on the set of values.

7. A method for controlling reductant mass deposits for an aftertreatment system on a real time basis, the method comprising:
identifying, by one or more processors, a set of values,
   wherein the set of values include one or more of a temperature value of an exhaust gas flow, a flow rate value of the exhaust gas flow, or a dosage rate value of reductant dosed in the exhaust gas flow;
estimating, by the one or more processors, a reductant deposit accumulation rate value based on the set of values;
estimating, by the one or more processors, a reductant deposit decomposition rate value based on the set of values;
calculating, by the one or more processors, a reductant mass deposit value based on the reductant deposit accumulation rate value and the reductant deposit decomposition rate value; and
performing a two-tier regeneration of the aftertreatment system based on the reductant mass deposit value,
   wherein performing the two-tier regeneration of the aftertreatment system comprises:
      performing a partial regeneration of the aftertreatment system when the reductant mass deposit value satisfies a first threshold; and
      performing a full regeneration of the aftertreatment system when at least the reductant mass deposit value satisfies a second threshold or a period of time satisfies a time threshold.

8. The method of claim 7, wherein the reductant mass deposit value is calculated for an inner surface of a mixing tube of the aftertreatment system.

9. The method of claim 7, where performing the partial regeneration of the aftertreatment system comprises:
performing the partial regeneration of the aftertreatment system when the reductant mass deposit value exceeds the first threshold.

10. The method of claim 7, where performing the full regeneration of the aftertreatment system comprises:
performing the full regeneration of the aftertreatment system when the reductant mass deposit value exceeds the second threshold.

11. The method of claim 7, further including:
controlling the dosage rate value of the reductant dosed into the exhaust gas flow based on the reductant mass deposit value.

12. The method of claim 7, further including:
estimating a reductant deposit temperature value based on the set of values received by the control module.

13. An aftertreatment system comprising:
a mixing tube adapted to receive an exhaust gas flow;
a selective catalytic reduction module positioned downstream of the mixing tube with respect to a flow direction of the exhaust gas flow; and
one or more processors are configured to:
   receive a set of values,
      wherein the set of values include a temperature value of the exhaust gas flow received from a temperature sensor, a flow rate value of the exhaust gas flow received from a flow rate sensor, and a dosage rate value of the reductant dosed in the exhaust gas flow;
   estimate a reductant deposit accumulation rate value based on the set of values;

estimate a reductant deposit decomposition rate value based on the set of values;

calculate a net reductant deposit growth rate value based on the reductant deposit accumulation rate value and the reductant deposit decomposition rate value; and calculate a reductant mass deposit value based on the net reductant deposit growth rate value, wherein a partial regeneration of the aftertreatment system is performed when the reductant mass deposit value satisfies a first threshold, and wherein a full regeneration of the aftertreatment system is performed when at least the reductant mass deposit value satisfies a second threshold or a period of time satisfies a predetermined time threshold.

14. The aftertreatment system of claim 13, wherein the reductant mass deposit value is calculated for an inner surface of the mixing tube.

15. The aftertreatment system of claim 13, wherein the reductant mass deposit value satisfies the first threshold when the reductant mass deposit value exceeds the first threshold.

16. The aftertreatment system of claim 13, wherein the reductant mass deposit value satisfies the second threshold when the reductant mass deposit value exceeds the second threshold.

17. The aftertreatment system of claim 13, wherein the reductant mass deposit value is used to control the dosage rate value of the reductant dosed into the exhaust gas flow.

18. The aftertreatment system of claim 13, wherein the one or more processors are further configured to:

estimate a reductant deposit temperature value based on the set of values.

19. The aftertreatment system of claim 13, wherein the reductant deposit accumulation rate value is proportional to a surface area of reductant mass deposits on an inner surface of the mixing tube.

20. The aftertreatment system of claim 13, wherein the first threshold is defined based on an allowable reductant mass deposit value that does not interference with an operation of the aftertreatment system.

* * * * *